(12) United States Patent
Barbour

(10) Patent No.: US 6,939,401 B2
(45) Date of Patent: Sep. 6, 2005

(54) SETTABLE COMPOSITION CONTAINING POTASSIUM CHLORIDE

(76) Inventor: Ronald Lee Barbour, 110 Brookside Dr., Apt. 2, Dover, OH (US) 44622

( * ) Notice: Subject to any disclaimer, the term of this patent is extended or adjusted under 35 U.S.C. 154(b) by 84 days.

(21) Appl. No.: 10/396,519

(22) Filed: Mar. 26, 2003

(65) Prior Publication Data

US 2003/0177953 A1 Sep. 25, 2003

Related U.S. Application Data

(63) Continuation-in-part of application No. 09/982,854, filed on Oct. 22, 2001, now Pat. No. 6,656,264.

(51) Int. Cl.$^7$ ............................................. C04B 18/08
(52) U.S. Cl. ................. 106/705; 707/714; 707/DIG. 1; 264/333; 264/DIG. 49
(58) Field of Search ................ 106/705, 707, 106/714, DIG. 1, 790; 264/333, DIG. 49

(56) References Cited

U.S. PATENT DOCUMENTS

| | | |
|---|---|---|
| 4,082,561 A | 4/1978 | Nakagawa et al. |
| 4,190,454 A | 2/1980 | Yamagisi et al. |
| 4,204,875 A | 5/1980 | Szalavitz |
| 4,670,055 A | 6/1987 | Koslowski |
| 4,842,649 A | 6/1989 | Heitzmann et al. |
| 5,032,181 A | 7/1991 | Chung |
| 5,284,513 A * | 2/1994 | Cowan et al. .............. 106/790 |
| 5,340,397 A | 8/1994 | Brothers |
| 5,588,990 A | 12/1996 | Dongell |
| 5,624,489 A * | 4/1997 | Fu et al. ..................... 106/692 |
| 5,626,665 A | 5/1997 | Barger et al. |
| 5,728,209 A | 3/1998 | Bury et al. |
| 5,785,751 A | 7/1998 | Bashlykov et al. |
| 5,788,762 A | 8/1998 | Barger et al. |
| 6,136,088 A | 10/2000 | Farrington |

FOREIGN PATENT DOCUMENTS

| | | | |
|---|---|---|---|
| JP | 56042976 | * | 4/1981 |
| JP | 11171628 | * | 6/1999 |
| KR | 134253 | * | 4/1998 |
| TW | 387866 | * | 4/2000 |

OTHER PUBLICATIONS

"Corrosion of cement paste in strong chlroide water solutions" Kurdowski, 1993, □□Prace Komisji Nauk Ceramicznych Ceramika (Polska Akademia Nauk), 42, (Advanced Ceramics,□□Glass and Mineral Binding Materials), 35–42.*

* cited by examiner

*Primary Examiner*—Paul Marcantoni
(74) *Attorney, Agent, or Firm*—Blank Rome LLP

(57) ABSTRACT

The present invention relates to settable compositions for general purpose concrete construction containing Class-F fly ash, Class-C fly ash and/or slag, and potassium chloride (KCl) as a substantial replacement for Portland cement conventionally used in such compositions. The potassium chloride is an additive for improved high early strength and accelerated setting times, thereby allowing the concrete structure to be put into service sooner, reducing labor cost, and allowing precast concrete and concrete masonry manufacturers to achieve rapid form and mold turnover.

15 Claims, No Drawings

SETTABLE COMPOSITION CONTAINING POTASSIUM CHLORIDE

This application is a continuation-in-part of U.S. patent application Ser. No. 09/982,854, filed Oct. 22, 2001 now U.S. Pat. No. 6,656,264.

FIELD OF THE INVENTION

The present invention relates to the field of settable compositions for general purpose concrete mixes, and more particularly to settable compositions containing additives for improved strength and shortened setting times.

BACKGROUND OF THE INVENTION

The present invention is concerned with the utilization of potassium chloride (KCI) as an additive for improving the one-day strength and for shortening the setting times of concrete mixes. Further, the invention is also concerned with the utilization of three industrial by-products; namely, Class-F fly ash, Class-C fly ash, and blast furnace slag in general purpose concrete-making compositions.

When finely divided or pulverized coal is combusted at high temperatures, for example, in boilers for the steam generation of electricity, the ash, consisting of the incombustible residue plus a small amount of residual combustible matter, is made up of two fractions, a bottom ash recovered from the furnace or boiler in the form of a slag-like material and a fly ash which remains suspended in the flue gases from the combustion until separated therefrom by known separation techniques, such as electrostatic precipitation. This fly ash is an extremely finely divided material generally in the form of spherical bead-like particles, with at least 70 percent by weight passing a 200 mesh sieve, and has a generally glassy state resulting from fusion or sintering during combustion. As recognized in the American Society of Testing Materials (ASTM) specification designations C618-00 entitled "Fly Ash and Raw or Calcined Natural Pozzolan for Use as a Mineral Admixture in Portland Cement Concrete" and D5370-96 entitled "Standard Specification for Pozzolanic Blended Materials in Construction Application," fly ash is subdivided into two distinct classifications; namely, Class-F and Class-C. The definitions of these two classes given in the aforementioned ASTM specifications are as follows:

"Class-F—Fly ash normally produced from burning anthracite or bituminous coal that meets the applicable requirements for this class as given herein. This class fly ash has pozzolanic properties.

Class-C—Fly ash normally produced from lignite or subbituminous coal that meets the applicable requirements for this class as given herein. This class of fly ash, in addition to having pozzolanic properties, also has some cementitious properties. Some Class-C fly ashes may contain lime contents higher than 10 percent."

The latter reference to "pozzolanic properties" refers to the capability of certain mixtures that are not in themselves cementitious, but are capable of undergoing a cementitious reaction when mixed with calcium hydroxide in the presence of water. Class-C fly ash possesses direct cementitious properties as well as pozzolanic properties. ASTM C618-00 is also applicable to natural pozzolanic materials that are separately classified as Class N but are not pertinent here.

As the above quotation from the ASTM specification indicates, the type of coal combusted generally determines which class fly ash results, and the type of coal in turn is often dependent upon its geographic origin. Thus, Class-C fly ash frequently results from the combustion of coals mined in the Midwest United States; whereas Class-F fly ash often comes from combustion of coals mined in the Appalachian region of the United States. The ASTM specification imposes certain chemical and physical requirements upon the respective fly ash classifications which are set forth in U.S. Pat. No. 5,520,730, the disclosure of which is incorporated herein by reference.

Blast furnace slag is a by-product of the production of iron in a blast furnace; silicon, calcium, aluminum, magnesium and oxygen are the major elemental components of slag. Blast furnace slags include air-cooled slag resulting from solidification of molten blast furnace slag under atmospheric conditions; granulated blast furnace slag, a glassy granular material formed when molten blast furnace slag is rapidly chilled as by immersion in water; and pelletized blast furnace slag produced by passing molten slag over a vibrating feed plate where it is expanded and cooled by water sprays, whence it passes onto a rotating drum from which it is dispatched into the air where it rapidly solidifies to spherical pellets. In general the glass content of the slag determines the cementitious character. Rapidly cooled slags have a higher glass content and are cementitious; slowly cooled slags are non-glassy and crystalline and, thus do not have significant cementitious properties.

The quantities of these by-product materials that are produced annually are enormous and are likely only to increase in the future. As petroleum oil as the fuel for the generation of electricity is reduced because of conservation efforts and unfavorable economics, and as political considerations increasingly preclude the construction of new nuclear power electrical generating facilities, or even the operation or continued operation of already completed units of this type, greater reliance will necessarily fall on coal as the fuel for generating electricity. As of 1979, the volume of Class-F fly ash that was available then was estimated to be about five times what could be readily utilized. The estimated annual total production of coal ash in the U.S. is about 66.8 million tons, while the annual total coal ash sales in the U.S. is only about 14.5 million tons. Further, in Canada, the recovery of copper, nickel, lead and zinc from their ores produces over twelve million tons of slag per year, which is usually accumulated near the smelters with no significant use. Obviously, there is an urgent and growing need to find effective ways of employing these unavoidable industrial by-products since they will otherwise collect at a staggering rate and create crucial concerns regarding their adverse environmental effects.

Various proposals have already been made for utilizing both types of fly ash. According to Lea (1971), *The Chemistry of Cement and Concrete*, Chemical Publishing Company, Inc., page 421 et seq., fly ash, i.e., Class-F type, from boilers was first reported to be potentially useful as a partial replacement for Portland cement in concrete construction about 50 years ago, and its utilization for that purpose has since become increasingly widespread. It is generally accepted that the proportion of Portland cement replaced by the usual fly ash should not exceed about 20 percent to avoid significant reduction in the compressive strength of the resultant concrete, although some more cautious jurisdictions may impose lower limits, e.g., the 15 percent maximum authorized by the Virginia Department of Highways and Transportation (VDHT). As described in Lea on page 437, the substitution of fly ash tends to retard the early rate of hardening of the concrete so that the concrete exhibits up to a 30 percent lower strength after seven days testing and up to a 25 percent lower strength after 28 days of testing, but in time the strength levels normalize at replacement levels up to 20 percent. Increasing the substitution quantity up to 30 percent gives more drastic reduction in the early compression values as well as an ultimate strength reduction of at least about 15 percent after one year.

The limited substitution of fly ash for Portland cement in concrete formulations has other effects beyond compressive strength changes, both positive and negative. The fly ash tends to increase the workability of the cement mix and is recognized as desirably reducing the reactivity of the Portland cement with so-called reactive aggregates. On the other hand, fly ash contains a minor content of uncombusted carbon that acts to absorb air entrained in the concrete. Because entrained air desirably increases the resistance of the hardened concrete to freezing, such reduction in entrained air is undesirable, but can be compensated for by the inclusion as an additive of so-called air-entraining agents.

Dodson, et al. in U.S. Pat. No. 4,210,457, while recognizing the accepted limit of 20 percent replacement with fly ash of the Portland cement in concrete mixes, proposes the substitution of larger amounts, preferably 50 percent or more, of the Portland cement with particular selected fly ashes having a combined content of silica, alumina and ferric oxide content, less than 80 percent by weight, and a calcium oxide content exceeding 10 percent, based on five samples of such ashes, varying from about 58–72 percent combined with a calcium oxide range of about 18–30 percent. Six other fly ash samples that are not suitable at the high replacement levels of 50 percent or more were shown to vary in the combined oxide content from about 87–92 percent and in calcium oxide content from about 4 percent to about 8 percent. Evaluating these values against the ASTM C618-00, one observes that the acceptable fly ashes come under the Class-C specifications, while the unacceptable ashes fell within the Class-F specification. Thus, Dodson, et al. in effect establish that Class-C fly ashes are suitable for substantially higher levels of replacement for Portland cement in concrete mixes than are Class-F fly ashes, and this capacity is now generally recognized, with Class-C fly ashes being generally permitted up to about a 50 percent replacement level while maintaining the desirable physical properties of the concrete, especially compressive strength.

In U.S. Pat. No. 4,240,952, Hulbert, et al. while also acknowledging the generally recognized permissible limit of Class-F fly ash replacement for Portland cement of 20 percent, propose replacement of at least 50 percent and up to 80 percent, provided the mix contains as special additives about 2 percent of gypsum and about 3 percent of calcium chloride by weight of the fly ash. The fly ash described for this purpose, however, was a Class-C fly ash analyzing about 28 percent calcium oxide and combined silica, alumina and ferric oxide content of about 63 percent. With up to 80 percent of this fly ash and the specified additives, compressive strengths comparable to straight Portland cement were said to be generally achievable. In one example using 140 pounds Portland cement and 560 pounds of fly ash (20:80 ratio) with conventional amounts of coarse and fine aggregate, and water and including the requisite additives, compressive strengths tested at 3180 psi for 7 days, 4200 psi for 14 days and about 5000 psi at 28 days.

In U.S. Pat. Nos. 4,018,617 and 4,101,332, Nicholson proposed the use of mixtures of fly ash (apparently Class-F in type), cement kiln dust and aggregate for creating a stabilized base supporting surface replacing conventional gravel or asphalt aggregate stabilized bases in road construction wherein the useful ranges were fly ash 6–24 percent, CKD (cement kiln dust) 4–16 percent and aggregate 60–90 percent, with 8 percent CKD, 12 percent fly ash and 80 percent aggregate preferred. Compressive strength values for such measures as revealed in the examples varied rather erratically and generally exhibited only small increases in compressive strength over the 7 to 28 day test period. Among the better results were for the preferred mixture wherein the values increased from about 1100 psi at 7 days to 1400 psi at 28 days. The addition of a small amount of calcium chloride improved those values by about 200 psi. On the other hand, the addition of 3 percent of lime stack dust recovered from a lime kiln significantly reduced the results to about 700 psi at 7 days to 900–1300 psi at 28 days. Elimination of the aggregate reduced the strength to a fraction of the values otherwise obtained, a mixture of 12 percent CKD and 88 percent fly ash alone showing strength values of only about 190–260 psi over the 28-day test period. Similarly, the choice of a finely divided aggregate such as fill sand resulted in about the same fractional level of strength values in the range of about 140–230 psi. A combination of finely divided and coarse aggregate in approximately equal amounts reduced the compressive strength values by about 50 percent with virtually no change over the test period, giving values ranging from 650–750 psi, except where 1 percent of Type 1 Portland cement was included which restored the strength values to about their original level, except at the initial 7 days period where the strength values were about 800–900 psi, increasing at 28 days to about 1200–1600 psi. Curiously, the best strength results were attained when 11.6 percent fly ash was combined with 3.4 percent lime with the balance crushed aggregate, the CKD being omitted entirely, for which the strength values while starting at a lower level of about 850–950 at 7 days increased to about 1700 psi at 28 days.

The combination of fly ash and lime stack dust incidentally mentioned in the later patent was explored further by Nicholson in U.S. Pat. No. 4,038,095 which concerns mixtures of about 10–14 percent fly ash, about 5–15 percent lime stack dust with the balance aggregate in the range of 71–85 percent. Somewhat inexplicably, the compressive results reported here for such mixtures do not reach the high level specified in the first two aforementioned Nicholson patents, the strength values specified being only about 1000 psi with the more general levels well below that depending on particular proportions.

In U.S. Pat. No. 4,268,316, Wills, Jr. discloses the use of mixtures of kiln dust and fly ash as a replacement for ground limestone and gypsum for forming a mortar or masonry cement, using proportions of about 25–55 percent Portland cement, about 25–65 percent CKD and 10–25 percent fly ash. When these mortar formulations were mixed with damp sand in the proportions of about one part cement mixture to 2.5–3 parts sand, compression strengths comparable to those of standard masonry cement composed of 55 percent cement clinkers, 40 percent limestone and 5 percent gypsum were shown for mixtures containing 50 percent cement, 24–40 percent CKD and 15–25 percent fly ash. Inexplicably, in one example, when the cement content was increased to 55 percent with 35 percent CKD and 10 percent fly ash, the compressive strengths dropped by about 30–40 percent at both the 7 day and 28 day ages to levels inferior to the standard material. As the cement content was decreased, with corresponding increases in the CKD, the compressive strength values dropped drastically. On the other hand, in another similar example, mixtures containing 55 percent cement, 35 percent CKD and 10 percent fly ash proved superior in compressive strength, particularly at the 28 day age, to mixtures containing 50 percent cement, 35 percent fly ash and 15 percent CKD, as well as other standard masonry cements containing 50 percent cement, 47 percent limestone and 3 percent gypsum. Indeed, strength values dropped about 40 percent for the mixtures having a 5 percent reduction in cement and a corresponding 5 percent increase in the fly ash to values definitely inferior to the standard cements. Similar variations were shown under laboratory test conditions for comparable 50/35/15 mixtures dependent on the source of the fly ash while under actual construction conditions for the same mixtures, compressive strength values were reduced by about 50 percent for both the conventional masonry cement containing 55 percent Portland cement and comparable mixtures within the patented concept. The fly ash here was preferably Class-F with Class-C materials being less desirable.

In U.S. Pat. No. 4,407,677, Wills, Jr. went on to teach that in the manufacture of concrete products such as blocks or bricks, the fly ash usually employed in combination with Portland cement therein could be replaced in its entirety by CKD with modest improvement in early compressive strength values for such products. Thus, at one-day and two-day tests compressive strength values of about 500–800 psi were shown, but were said to increase to about 1200 psi after 28 days. The mixes disclosed in Wills, Jr. '677 contained 0.4–0.9 parts cement, about 0.1–0.6 parts CKD and 10–12 parts aggregate combining both fine and coarse materials, such as expanded shale and natural sand in a weight ratio of 80/20. Masonry cements generally develop at least about 95 percent of their strength properties at 28 days age so that additional aging of the patented products would not be expected to result in any significant increase in their compressive strength values.

U.S. Pat. Nos. 5,520,730 and 5,266,111 of the present inventor, disclose a general purpose concrete composition comprising Portland cement, Class-F fly ash, and CKD. The patents also disclose a "synthetic Class-C fly ash blend" comprising Class-F fly ash and CKD. These patents disclose the advantages of early strength of concrete; however, utilization of potassium chloride as a cement additive is not disclosed.

In U.S. Pat. No. 5,032,181, Chung discloses a carbon reinforced cement that displays high tensile and flexural strengths. During the fabrication of the cement, an accelerating agent mixture is also added. The accelerating mixture comprises polyethanolamine plus either (1) metal sulfate and metal aluminum sulfate, or (2) metal nitrite and metal chloride. The metal sulfate can be potassium sulfate; and the metal chloride can be potassium chloride. There is no disclosure in the patent regarding the one-day strength of the disclosed general purpose concrete compositions.

None of the above patents addresses the issue of early strength and setting times of concrete; therefore, there remains a need for concrete mixes with high early strength and fast setting times, because the addition of fly ash to concrete often results in slow setting. There are many advantages for having high early strength and fast setting times, such as allowing the concrete structure to be put into service sooner, thereby reducing labor cost, and allowing precast concrete and concrete masonry manufacturers to achieve rapid form and mold turnover.

SUMMARY OF THE INVENTION

An advantage of the present invention is to provide a settable composition for improved early strength comprising cement and potassium chloride. In a preferred embodiment, the cement is present in an amount greater than about 50 percent by weight, the potassium chloride is present in an amount of about 1 percent to about 5 percent by weight.

A further advantage of the present invention is to provide a settable composition for improved early strength comprising cement, Class-F fly ash, and potassium chloride. In a preferred embodiment, the cement is present in an amount greater than about 50 percent by weight, the Class-F fly ash is present in an amount of about 20 percent to about 30 percent by weight, and the potassium chloride is present in an amount of about 1 percent to about 5 percent by weight.

A further advantage of the present invention is to provide a settable composition for improved early strength comprising cement, Class-C fly ash, and potassium chloride. In a preferred embodiment, the cement is present in an amount greater than about 50 percent by weight, the Class-C fly ash is present in an amount of about 20 percent to about 30 percent by weight, and the potassium chloride is present in an amount of about 1 percent to about 5 percent by weight.

A further advantage of the present invention is to provide a settable composition for improved early strength comprising cement, Class-C fly ash, Class-F fly ash, and potassium chloride. In a preferred embodiment, the cement is present in an amount greater than about 50 percent by weight, the Class-C fly ash is present in an amount of about 10 percent to about 20 percent by weight, the Class-F fly ash is present in an amount of about 10 percent to about 20 percent by weight, and the potassium chloride is present in an amount of about 1 percent to about 5 percent by weight.

A further advantage of the present invention is to provide a settable composition for improved early strength comprising cement, slag, and potassium chloride. In a preferred embodiment, the cement is present in an amount greater than about 50 percent by weight, the slag is present in an amount of about 20 percent to about 50 percent by weight, and the potassium chloride is present in an amount of about 1 percent to about 5 percent by weight.

Methods of making concrete from the above compositions are also disclosed.

DETAILED DESCRIPTION OF THE INVENTION

Several different types of Portland cement are available and all are useful with the present invention. Type I is the general purpose variety and is most commonly employed, but Type III can also be used for the early strength application of the present invention. Commercial blended cements, such as Type I–P, wherein 20 percent Class-F fly ash is blended with 80 percent by weight Portland cement clinker during pulverization should be avoided.

Any standard or common Class-F fly ash obtained from boilers and like furnaces used for the combustion of pulverized coal, particularly of a bituminous or anthracite type, and especially from coal-fired, steam-generating plants of electrical utilities, is suitable for use as the Class-F fly ash component of this invention. Such fly ash should have a combined silica, alumina and ferric oxide content of at least about 70 percent and preferably 80 percent or higher by weight and a lime (CaO) content below about 10 percent, usually about 6 percent by weight or less.

Any standard or common Class-C fly ash obtained from the burning of lignite or subbituminous coal is suitable for use as the Class-C fly ash component of this invention. Such Class-C fly ash generally contains more calcium and less iron than Class-F fly ash and has a lime content in the range of 15 percent to 30 percent.

Likewise, any blast furnace slag is appropriate for the present invention. Slag is a non-metallic coproduct produced in the production of iron in a blast furnace. It consists primarily of silicates, aluminosilicates and calcium-alumina-silicates. The molten slag usually comprises about twenty percent by mass of iron production. Different forms of slag products are produced depending on the method used to cool the molten slag. These products include air-cooled blast furnace slag, expanded or foamed slag, pelletized slag, and granulated blast furnace slag. Granulated blast furnace slag satisfying the ASTM 989 specification is preferred.

Any potassium chloride is appropriate for the present invention. Potassium chloride is a ubiquitous salt generally occurring as a white granular powder or colorless crystal. Commercially, potassium chloride is available in a wide range from pharmaceutical grade to potash (about 96 percent KCl) for fertilizer. Although any potassium chloride is appropriate for the present invention, cost is a major consideration because potassium chloride is available in many grades. Therefore, the least expensive form of potassium chloride that is effective for the present invention is most preferred.

As will be established hereinafter, within the above limits for the compositions of the invention, the concretes produced therefrom exhibit substantially comparable or superior properties for use in general purpose cement construction, especially one-day compressive strength to corresponding all Portland cement mixes.

Concrete mixes using the present invention may also contain aggregate materials. The choice of aggregate material for concrete mixes using the present blends will pose no problem to the person skilled in the design of such mixes. The coarse aggregate should have a minimum size of about ⅜ inch and can vary in size from that minimum up to one inch or larger, preferably in gradations between these limits. Crushed limestone, gravel and the like are desirable coarse aggregates, and the material selected in any case should exhibit a considerable hardness and durability inasmuch as crumbly, friable aggregates tend to significantly reduce the strength of the ultimate concrete. The finely divided aggregate is smaller than ⅜ inch in size and again is preferably graduated in much finer sizes down to 200-sieve size or so. Ground limestone, sand and the like are common useful fine aggregates.

In accordance with the present invention, silica fume can also be added to the cement mixture to achieve high strength and chloride protection for the concrete. Silica fume is preferably used from 3–12 percent of the amount of cement that is being used in the mixture.

Other additives can also be used in accordance with the present invention, including, but are not limited to, water reducers, accelerators, air entrainment agents, as well as other additives that are commonly used in the concrete industry.

The mixes of the invention are prepared by homogeneously and uniformly mixing all of the mix ingredients including the Class-F fly ash, Class-C fly ash, slag, and potassium chloride. Mixing can be accomplished with mixing techniques commonly employed in the concrete mix industry. The ultimate compositions are no more susceptible to undergoing separation during handling and storage than are ordinary concrete mixes. They can be transported and stored in the same manner as the ordinary mixes, as can the individual ingredients. The storage containers should, of course, be closed to protect the contents thereof from weather.

The following examples are given to illustrate the present invention. It should be understood that the invention is not limited to the specific conditions or details described in these examples.

The results in the following examples were actually obtained by preliminarily blending, in each case, the Class-F fly ash, Class-C fly ash, slag, and potassium chloride together and combining the blend with the other mix ingredients. However, the results would be identical if the same proportionate amount for each of the component was added separately to the remaining mix ingredients and the proportionate amounts of the Class-F fly ash, Class-C fly ash, slag, and potassium chloride have been expressed in each case in terms of their relative weight percentages of the particular mix.

EXAMPLE 1

TABLE 1A

| Mix # | Cement (%) | KCl (%) | 1 Day PSI | Setting Time (minutes) Initial | Final |
|---|---|---|---|---|---|
| 1 | 100 | 0 | 2670 | 230 | 315 |
| 2 | 98.5 | 1.5 | 4060 | 210 | 285 |
| 3 | 97 | 3 | 4520 | 195 | 250 |
| 4 | 95.5 | 4.5 | 4260 | 175 | 235 |

TABLE 1B

| Mix # | 7 Day PSI | 28 Day PSI |
|---|---|---|
| 1 | 5780 | 7660 |
| 2 | 6560 | 7550 |
| 3 | 6410 | 7260 |
| 4 | 6160 | 6780 |

In Example 1, the cements which include potassium chloride (Mix #2–4) are compared with the cement without potassium chloride (Mix #1). Samples were tested for compressive strength in accordance with ASTM C-109 and for setting times in accordance with ASTM C-403/C-403M-99.

EXAMPLE 2

TABLE 2A

| Mix # | Cement (%) | Class-F fly ash (%) | KCl (%) | 1 Day PSI | Setting Time (minutes) Initial | Final |
|---|---|---|---|---|---|---|
| 5 | 70 | 30 | 0 | 1860 | 290 | 390 |
| 6 | 70 | 28.5 | 1.5 | 2840 | 225 | 305 |
| 7 | 70 | 27 | 3 | 3090 | 215 | 300 |
| 8 | 70 | 25.5 | 4.5 | 2960 | 200 | 275 |

TABLE 2B

| Mix # | 7 Day PSI | 28 Day PSI |
|---|---|---|
| 5 | 4310 | 6030 |
| 6 | 4990 | 6000 |
| 7 | 4910 | 5890 |
| 8 | 4710 | 5740 |

In Example 2, the cements which include Class-F fly ash and potassium chloride (Mix #6–8) are compared with the cement with Class-F fly ash only (Mix #5). Samples were tested for compressive strength in accordance with ASTM C-109 and for setting times in accordance with ASTM C-403/C-403M-99.

EXAMPLE 3

TABLE 3A

| Mix # | Cement (%) | Class-C fly ash (%) | KCl (%) | 1 Day PSI | Setting Time (minutes) Initial | Final |
|---|---|---|---|---|---|---|
| 9 | 70 | 30 | 0 | 2080 | 380 | 460 |
| 10 | 70 | 28.5 | 1.5 | 3020 | 305 | 375 |
| 11 | 70 | 27 | 3 | 3500 | 280 | 340 |
| 12 | 70 | 25.5 | 4.5 | 3320 | 255 | 305 |

TABLE 3B

| Mix # | 7 Day PSI | 28 Day PSI |
|---|---|---|
| 9 | 6000 | 7820 |
| 10 | 5780 | 7030 |
| 11 | 5630 | 6700 |
| 12 | 5480 | 6380 |

In Example 3, the cements which include Class-C fly ash and potassium chloride (Mix #10–12) are compared with the cement with Class-C fly ash only(Mix #9). Samples were tested for compressive strength in accordance with ASTM C-109 and for setting times in accordance with ASTM C-403/C-403M-99.

EXAMPLE 4

TABLE 4A

| Mix # | Cement (%) | Class CF fly ash (%) | KCl (%) | 1 Day PSI | Setting Time (minutes) Initial | Final |
|---|---|---|---|---|---|---|
| 13 | 70 | 30 | 0 | 1960 | 320 | 405 |
| 14 | 70 | 98.5 | 1.5 | 2980 | 260 | 335 |
| 15 | 70 | 97 | 3 | 3200 | 235 | 300 |
| 16 | 70 | 95.5 | 4.5 | 3190 | 220 | 290 |

TABLE 4B

| Mix # | 7 Day PSI | 28 Day PSI |
|---|---|---|
| 13 | 5160 | 6740 |
| 14 | 5410 | 6430 |
| 15 | 5410 | 6190 |
| 16 | 5050 | 6020 |

In Example 4, the cements which include Class CF fly ash and potassium chloride (Mix #14–16) are compared with the cement with Class CF fly ash only (Mix #13). Samples were tested for compressive strength in accordance with ASTM C-109 and for setting times in accordance with ASTM C-403/C-403M-99.

Class CF fly ash is the product of a mixture of western and eastern coal. An all-western coal produces Class-C fly ash; and an all-eastern coal produces Class-F fly ash. Because of emissions and environmental concerns, power plants may burn a mixture of eastern and western coals. Further, the percentages of eastern and western coals may vary according to the needs of the individual power plant. The CF ash used in Example 4 is the product of a 50/50 blend of eastern and western coal.

EXAMPLE 5

TABLE 5A

| Mix # | Cement (%) | Slag (%) | KCl (%) | 1 Day PSI | Setting Time (minutes) Initial | Final |
|---|---|---|---|---|---|---|
| 17 | 70 | 30 | 0 | 2080 | 245 | 335 |
| 18 | 70 | 28.5 | 1.5 | 2780 | 215 | 285 |
| 19 | 70 | 17 | 3 | 3080 | 195 | 255 |
| 20 | 70 | 25.5 | 4.5 | 2930 | 190 | 240 |
| 21 | 50 | 50 | 0 | 1410 | 275 | 365 |
| 22 | 49.25 | 49.25 | 1.5 | 1830 | 230 | 310 |
| 23 | 48.5 | 48.5 | 3 | 1830 | 230 | 310 |

TABLE 5B

| Mix # | 7 Day PSI | 28 Day PSI |
|---|---|---|
| 17 | 4910 | 6750 |
| 18 | 6040 | 7610 |
| 19 | 6240 | 6990 |
| 20 | 5660 | 6970 |
| 21 | 4120 | 6500 |
| 22 | 5020 | 6810 |
| 23 | 5000 | 6990 |

In Example 5, the cements which include slag and potassium chloride (Mix #18–20 and 22–23) are compared with cements with slag only (Mix #17 and 21). Samples were tested for compressive strength in accordance with ASTM C-109 and for setting times in accordance with ASTM C-403/C-403M-99.

The above examples clearly show improved one day strength and setting times of concrete by the addition of up to about 5 percent potassium chloride. The improvement is effective not only for cement, but also for mixes comprising industrial by-products such Class-F fly ash, Class-C fly ash, blast furnace slag, and combinations thereof. The invention, however, is not limited to the conditions illustrated in the examples.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A settable composition comprising cement, slag, Class-C fly ash, and potassium chloride.

2. The composition of claim 1, wherein the cement is Portland cement.

3. The composition of claim 1, wherein the cement is present in an amount of at least about 50 percent by weight based on the total weight of the settable composition.

4. The composition of claim 1, wherein the slag is present in an amount of about 5 percent to about 50 percent by weight based on the total weight of the settable composition.

5. The composition of claim 1, wherein the potassium chloride is present in an amount of about 1 percent to about 5 percent by weight based on the total weight of the settable composition.

6. The composition of claim 1, wherein the cement is present in an amount of at least about 50 percent, the slag is present in an amount of about 20 percent to about 30 percent, the potassium chloride is present in an amount of about 1 percent to about 5 percent, and Class-C fly ash is present in an amount of about 20 percent to about 30 percent, wherein all percentages are based on the total weight of the settable composition.

7. A method of making concrete comprising steps of
   i) mixing the settable composition of claim 1 with water, sand, and gravel to form a mixture;
   ii) forming the mixture into a shape;
   iii) allowing the mixture to harden to form concrete.

8. The method of claim 7, wherein the cement is Portland cement.

9. The method of claim 7, wherein the cement is present in an amount of at least about 50 percent by weight based on the total weight of the settable composition.

10. The method of claim 7, wherein the slag is present in an amount of about 5 percent to about 50 percent by weight based on the total weight of the settable composition.

11. The method of claim 7, wherein the potassium chloride is present in an amount of about 1 percent to about 5 percent by weight based on the total weight of the settable composition.

12. The method of claim 7, wherein the cement is present in an amount of at least about 50 percent, the slag is present in an amount of about 20 percent to about 30 percent, and the potassium chloride is present in an amount of about 1 percent to about 5 percent, and Class-C fly ash is present in an amount of about 20 percent to about 30 percent, wherein all percentages are based on the total weight of the settable composition.

13. The method of claim 7, wherein the forming step comprises pouring the mixture into a form prior to allowing the mixture to harden.

14. The composition of claim 1, wherein the Class-C fly ash is present in an amount of about 20 percent to about 30 percent.

15. The method of claim 7, wherein the Class-C fly ash is present in an amount of about 20 percent to about 30 percent.

* * * * *